Figure 1:
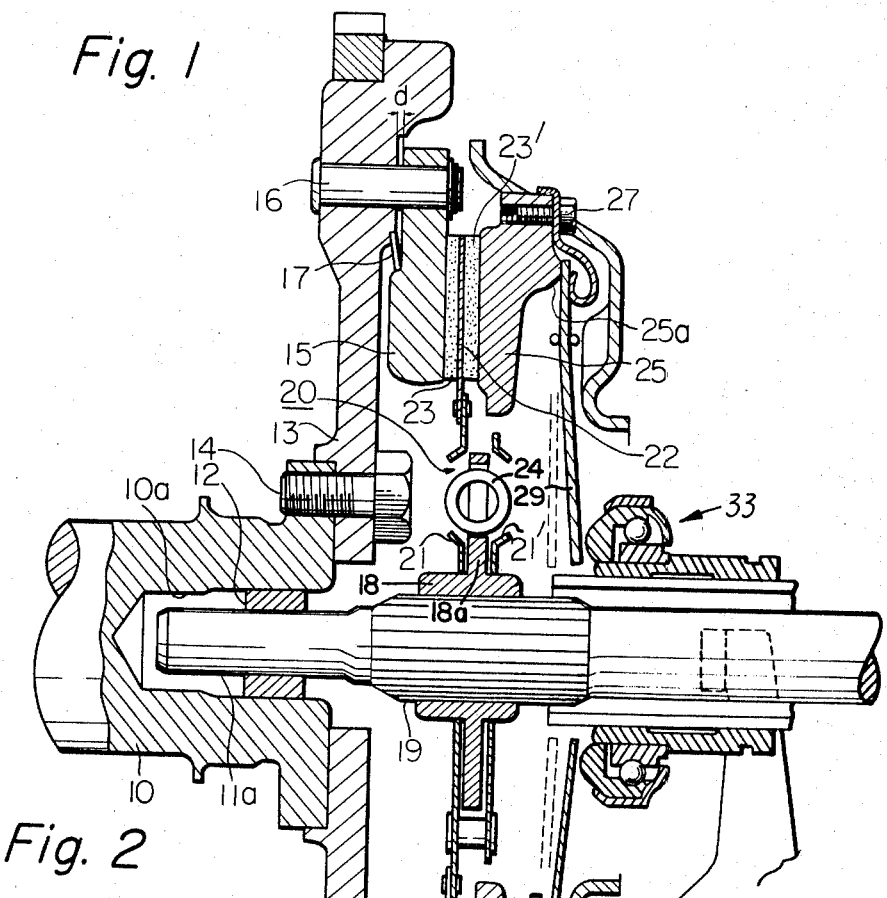

United States Patent [19]

Shono

[11] 3,739,896

[45] June 19, 1973

[54] FRICTION CLUTCH

[75] Inventor: Kinji Shono, Wakoh, Japan

[73] Assignee: Nissan Motor Company, Limited, Yokohama, Japan

[22] Filed: Dec. 20, 1971

[21] Appl. No.: 209,757

[30] Foreign Application Priority Data
Dec. 28, 1970 Japan.............................. 45/132196

[52] U.S. Cl. ............................. 192/70.27, 192/89 B
[51] Int. Cl. .......................................... F16d 13/44
[58] Field of Search..................... 192/70.27, 70.28, 192/89 B

[56] References Cited
UNITED STATES PATENTS

| | | | |
|---|---|---|---|
| 2,090,265 | 8/1937 | Padgett........................ | 192/70.27 X |
| 2,630,897 | 3/1953 | Porter.............................. | 192/89 B |
| 2,700,444 | 1/1955 | Ahlen............................... | 192/89 B |

FOREIGN PATENTS OR APPLICATIONS 1,027,999 4/1958 Germany........................... 192/89 B Primary Examiner—Allan D. Herrmann
Attorney—Robert E. Burns and Emmanuel J. Lobato

[57] ABSTRACT

An improved dry-disc friction clutch for motor vehicle power transmission systems is disclosed, which is adapted to be disengaged completely and immediately when a forward drive condition is to be established from idling. The friction clutch includes a flywheel which is made up of cooperating main and subsidiary driving plates which are normally spaced from each other by suitable spring means. The subsidiary driving plate is positively moved away from the friction-engaging plate when the clutch pedal is depressed and the clutch spring is moved to disengage the pressure plate from the friction-engaging plate.

5 Claims, 2 Drawing Figures

PATENTED JUN 19 1973 3,739,896

FRICTION CLUTCH

The invention is concerned with friction-engaging devices and, more particularly, it relates to friction clutches of the dry-disc type having a friction-engaging plate which can be clamped between a driving member such as a flywheel and a pressure plate axially movable relative to the driving member. The friction-engaging device or the friction clutch herein disclosed is specifically adapted for being incorporated in a motor vehicle power transmission system of the counter-shaft type in which power delivered from an engine crankshaft is selectively transmitted to main and counter drive shafts through coupling of the friction-engaging device or clutch.

The dry-disc friction clutches which are usually employed in the motor vehicle power transmission systems generally use a flywheel rotatable with the engine crankshaft and a pressure plate drivingly connected to the flywheel so that a driven element interposed between the flywheel and the pressure plate engages with the flywheel whereby drive torque is transmitted from the engine crankshaft to transmission input shaft. This driven element is usually a friction-engaging plate secured to a clutch hub which is splined or keyed to the transmission input shaft and is friction-engageable with a back face of the flywheel and a front face of the pressure plate. The pressure plate is biased to a position in which the friction-engaging plate is held in friction-engagement with the flywheel. When a clutch pedal for the transmission system is depressed, the pressure plate is retracted from the friction-engaging plate so that the friction-engaging plate is disengaged from the flywheel, thereby interrupting the power through the clutch. It is, in this instance, important that, when the pressure plate is released from the friction-engaging plate, then the friction-engaging plate be completely and immediately free from contact with the flywheel so that no drive torque is transmitted to the transmission input shaft.

Where the friction clutches of the above described construction are incorporated in the motor vehicle power transmission systems of the counter-shaft type, a difficulty is sometimes encountered in that smooth sliding engagement between the transmission input shaft and the clutch hub supporting the friction-engaging plate is impaired especially after the clutches have been used for an extended period of time. This causes the friction-engaging plate to fail to completely and immediately withdraw from the flywheel with the result that the transmission of the drive torque is continued even when the clutch pedal is in a depressed condition. A number of attempts have therefore been made so as to eliminate the difficulty of this nature, none of such attempts having proved successful.

The power transmission system of the counter-shaft type has a main drive gear formed at an end of the transmission input shaft and a counter gear formed on the counter-shaft and in constant mesh with the main drive gear. The main drive gear is usually a left-hand helical gear while the counter gear is a right-hand helical gear. When, therefore, the transmission system is shifted from idling to forward drive condition, an axial thrust is imparted to that transmission input shaft by continuous action along the helices of mating teeth of the two helical gears. This axial thrust acts upon the transmission input shaft, which, as a result, is urged or actually moved toward the engine crankshaft. If, in this condition, the transmission input shaft fails to freely slide on the clutch hub to which it is splined, then the friction-engaging plate supported by the hub tends to move toward the flywheel. Rotation of the flywheel is thus objectionably transmitted to the friction-engaging plate and accordingly to the transmission input shaft even though the pressure plate is held in its retracted position.

Such problems will be solved if the helical main drive and counter gears of the transmission system are substituted for usual spur gears so that no axial thrust is imparted to the transmission input shaft. The use of the spur gear, however, creates other important problems such as the degraded durability and generation of noises and, as such, are practically acceptable. The above-noted problem will also be solved if the directions of the helix angles of the helical gears are inversed, viz., if the main drive gear is a right-hand helical gear and the counter gear is a left-hand helical gear. In this instance, the axial thrust resulting from the rotation of the helical gears is imparted to the transmission input shaft in a reversed direction, viz., toward the main drive shaft or away from the engine crankshaft so that difficulties are now encountered in how to bear the axial thrust within the overall structure of the power transmission system. In order that this axial thrust to borne within the power transmission system structure in a satisfactory condition, the power transmission system of the counter-shaft type presently in common use will require extensive and somewhat drastic changes and modification.

It is, therefore, an important object of this invention to provide an improved friction-engaging device, such as a friction clutch for motor vehicle power transmission systems, which can be completely and reliably disengaged when it is desired to have the delivery of the drive torque interrupted therethrough.

It is another important object of the invention to provide an improved dry-disc friction clutch which is specifically adapted for use in motor vehicle power transmission systems of the counter-shaft type.

It is a further important object of the invention to provide an improved dry-disc friction clutch for the counter-shaft power transmission system using usual helical gears for transmitting the drive torque from the transmission input shaft to the counter-shaft, which clutch is capable of being disengaged immediately and completely when the clutch pedal for the transmission system is depressed during idling so as to establish forward drive condition.

It is a still further important object of the invention to provide an improved dry-disc friction clutch for the described motor vehicle power transmission systems, wherein the driven member or friction-engaging plate can be disengaged from the engine flywheel completely and immediately when the pressure plate is retracted therefrom even though the friction-engaging plate is moved toward the flywheel due to the deteriorated sliding engagement between the transmission input shaft and the clutch hub splined thereto.

These and other objects of this invention can be accomplished economically in a friction-engaging device which basically comprises substantially concentrically aligned, relatively rotatable members including a main driving plate, a subsidiary driving plate connected to and substantially spaced from the main driving plate, the subsidiary driving plate being axially movable toward the main driving plate, a pressure plate positioned at a spacing from the subsidiary driving plate, at least one friction-engaging plate positioned intermediate between and engageable with the subsidiary driving plate and the pressure plate, and a cover member which is fast at its edge on the subsidiary driving plate; first spring means positioned between the pressure plate and the cover member and having a neutral position biasing the subsidiary driving plate and cover member toward each other to force the friction-engaging plate into engagement therebetween; and second spring means interposed between the main and subsidiary driving member for biasing the subsidiary driving plate toward the pressure plate through the friction-engaging plate. The second spring means may be a diaphragm spring and/or a compression spring and is adapted to be compressed when the subsidiary driving plate is forced toward the main driving plate when the coned disc spring is retracted from the neutral position so that the pressure plate is caused to withdraw from the friction-engaging plate whereby the power train through the friction-engaging plate is destroyed.

Where the friction-engaging device thus constructed is used as a friction clutch for a motor vehicle power transmission system of the counter-shaft type, the main and subsidiary driving plate constitutes, in combination, an engine flywheel and, as such, is rotated together with the engine crankshaft. In this instance, the friction-engaging plate is secured to a clutch hub which is splined or keyed or otherwise axially movably mounted on the transmission input shaft. The coned disc spring is associated with a clutch release means such as a clutch release bearing which is axially slidable over the transmission input shaft and which is operatively connected to a clutch pedal through a suitable mechanical linkage including, for instance, a clutch release fork or withdrawal lever, as customary.

Figure 2:
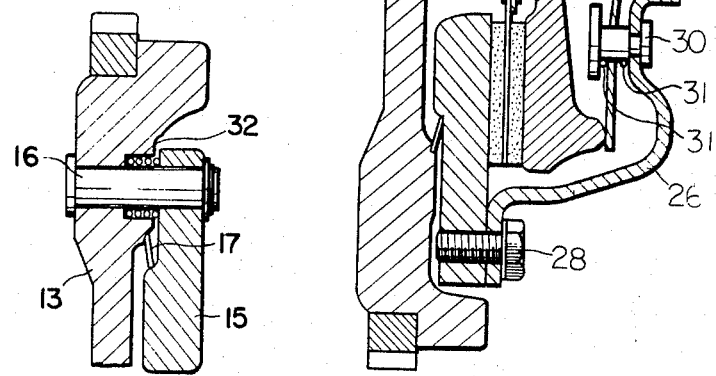

Other features and advantages of the friction-engaging device or, in a most practical form, the dry-disc friction clutch in accordance with this invention will become more apparent from the following detailed description with reference to the accompanying drawing in which:

FIG. 1 is a longitudinal sectional view showing a preferred embodiment of the device according to the invention; and FIG. 2 is a fragmentary view showing essential parts of another preferred embodiment of the device according to the invention.

Referring now to FIG. 1, the friction clutch according to this invention as shown forms part of a motor vehicle power transmission system of the counter-shaft type which includes a crankshaft 10 driven from a motor vehicle engine, not shown, and a transmission input shaft 11 having a pilot end portion 11a extending into an axial bore 10a in the crankshaft 10. The transmission input shaft 11 is rotatable relative to the crankshaft 10 through a pilot bearing 12. A flywheel 13 as a main driving plate is connected to the crankshaft 10 through a bolt 14 or any other fastening means. A generally annular member 15 as a subsidiary driving member is connected to the flywheel 13 through a guide pin 16 in such a manner that the annular member 15 is movable toward and away from the flywheel 13. A diaphragm spring 17 is interposed between the flywheel 13 and annular member 15 so that the annular member is biased to be spaced a distance $d$ from the flywheel when the clutch is in a coupled position which is illustrated.

A clutch hub 18 having a radial extension or flange rivetted 18a is axially interally splinded to engage external splines 19 on the transmission input shaft 11 so as to be axially movable on the shaft 11. This clutch hub 18 supports thereon a friction-engaging plate which is generally designated by reference numeral 20. This friction-engaging plate 20 is usually made up of clutch disc mounts 21 and 21' which are fast on both faces of the flange portion 18a of the clutch hub 18, a clutch disc or cushioning plate 22 radially extending from the clutch disc mount 21, and a pair of clutch friction facings 23 and 23' which are rivettpd or bonded to the cushioning plate 22. These friction facings 23 and 23' are usually in an annular form and one of them, which is shown as the facing 23, is so positioned as to be friction-engageable with the annular member or subsidiary driving plate 15 when the friction-engaging plate 20 is held in an operative position illustrated in FIG. 1. Designated by reference numeral 24 is a vibration damper which include a coil spring received within the flange portion 18a of the hub 18 and disposed in openings in the clutch disc mounts 21 and 21', as usual.

A pressure plate 25 is located adjacent the friction-engaging plate 20 in a manner to be engageable with the friction facing 23' of the plate 20. This pressure plate 25 is mounted on an axially movable clutch cover 26 through a bolt 27, the clutch cover thus containing therein the friction-engaging plate 20 and pressure plate 25, as shown. The clutch cover 26 is secured at its edge to the annular member 15 through a bolt 28 so as to be rotatable therewith.

A coned disc spring 29 is located to be intermediate between the pressure plate 25 and the radial wall portion of the clutch cover 26 and secured to the clutch cover through a thrust rivet 30 which is loaded by thrust rings 31 and 31'. This coned disc spring 29 has its outer peripheral edge seated on the back face, shown as protruded as at 25a, of the pressure plate 25 and its inner peripheral edge surrounding the transmission input shaft 11, as illustrated. The coned disc spring 29 thus biases the pressure plate 25 toward the annular member 15 so that the friction-engaging plate 20 is pressed against and rotatable with the annular member whereby the rotation of the crankshaft 10 is transmitted to the transmission input shaft 11 through the friction-engaging plate 20. The coned disc spring 29 is associated with a clutch release mechanism, generally designated by numeral 33, which usually includes a clutch release bearing, not designated, mounted over the transmission input shaft 11 and a withdrawal level operated by a clutch pedal, not shown, so as to move the clutch release bearing toward and away from the disc spring 29, as usual. The transmission input shaft 11 is operatively connected at its leading end portion with main and counter drive shafts through a transmission synchronizer and a gearing, respectively. This gearing includes a main drive gear formed on the transmission input shaft and a counter gear formed on the counter shaft and in constant mesh with the main drive gear. The main and counter drive gears are left-hand and right-hand helical gears, respectively, as previously noted.

When, now, the clutch pedal is depressed and consequently the clutch release bearing is caused to press upon the coned disc spring 29, then the disc spring is moved or deformed to the position indicated by broken lines so that the pressure plate 25 is freed from the spring action and retracted from the friction-engaging plate 20. Concurrently, the clutch cover 26 is moved or deformed in a manner to urge the annular member 15 toward the flywheel 13 from which it has been spaced the distance $d$. The result is that the annular member of subsidiary driving plate 15 is forced toward the flywheel 13 against the spring action exerted by the diaphragm spring 17, thereby facilitating the friction-engaging plate 20 to be disengaged from the annular member 15. As already described, when the transmission system is to be shifted from idling to the forward drive condition, the transmission input shaft 11 is urged toward the crankshaft 10 by reason of the axial thrust exerted thereto by the rotation of the helical main and counter drive gears. The friction-engaging plate 20 is then also forced toward the annular member 15 if smooth sliding of the clutch hub 18 on the shaft 11 is difficult due to wear of the splines, accumulation of dust or the like. Even in this case, the clutch can be uncoupled completely and immediately by the construction according to the invention as described.

FIG. 2 shows another embodiment of the device according to the invention, in which a compression spring 32 is interposed between the flywheel 13 and annular member 15 in addition to the diaphragm spring 17. In this instance, the diaphragm spring 17 may be removed so that the spring action between the flywheel 13 and annular member 15 is exerted solely by the compression spring 32.

It will now be appreciated from the foregoing description that the friction-engaging device according to this invention is characterized in that flywheel assembly is made up of two members such as the main and subsidiary driving plates 13 and 15 and that suitable spring means such as the diaphragm spring 17 and/or compression spring 32 is interposed between these two driving plates so as to prevent improper or retarded disengagement of the friction clutch otherwise caused when the forward drive condition is to be established from idling.

Although the friction-engaging device or friction clutch embodying this invention has been shown and described as being of the single-disc type, the features resulting from the invention are applicable to the friction clutches of the multiple disc type.

What is claimed is:

1. A friction-engaging device comprising a rotatable main driving plate, a subsidiary driving plate connected to and spaced from said main driving plate and movable relative thereto, a pressure plate spaced from said subsidiary driving plate, at least one rotatable friction-engaging plate disposed between and engageable with said subsidiary driving plate and said pressure plate, and an axially movable cover member connected to said subsidiary driving plate and said pressure plate, first spring means positioned between said pressure plate and said cover member and having a neutral position for biasing said cover member and said pressure plate toward said subsidiary driving plate thereby forcing said friction-engaging plate into engagement with said pressure plate and said subsidiary driving plate; second spring means interposed between said main driving plate and said subsidiary driving plate for biasing said subsidiary driving plate away from said main driving plate; and an actuatable release mechanism engageable with said first spring means for moving said first spring means from said neutral position when actuated whereby said pressure plate and said subsidiary driving plate are disengaged from said friction-engaging plate.

2. A friction-engaging device according to claim 1, in which said second spring means comprises a diaphragm spring.

3. A friction-engaging device according to claim 1, in which said second spring means comprises a compression spring.

4. A friction-engaging device according to claim 1, in which said second spring means comprises a diaphragm spring and a compression spring.

5. In a motor vehicle having an engine crankshaft and a power transmission of the counter-shaft type having an input shaft, and a fly-wheel connected to and rotatable with the engine crankshaft, a friction clutch for coupling said engine crankshaft to said transmission input shaft comprising an annular member connected to and spaced from said flywheel and movable relative thereto, a pressure plate spaced from said annular member, at least one friction-engaging plate disposed between and engageable with said annular member and said pressure plate, a clutch hub axially movable along said transmission input shaft and supporting said friction-engaging plate, an axially movable clutch cover connected to said annular member and said pressure plate and axially movable toward and away from said flywheel, first spring means disposed between said pressure plate and said clutch cover and having a neutral position in which said annular member and said clutch cover and said pressure plate are biased toward each other thereby forcing said friction-engaging plate into friction engagement with said annular member and said pressure plate, second spring means interposed between said flywheel and said annular member for biasing the annular member away from the flywheel, and an actuatable clutch release mechanism engageable with said first spring means for moving said first spring means from said neutral position when actuated whereby said pressure plate and said annular member are disengaged from said friction-engaging plate.

* * * * *